US010572353B2

(12) United States Patent
Yadav et al.

(10) Patent No.: US 10,572,353 B2
(45) Date of Patent: Feb. 25, 2020

(54) METHOD AND SYSTEM FOR SINGLE WEB APPLICATION RECOVERY ON A COLLABORATIVE PLATFORM

(71) Applicant: EMC IP Holding Company LLC, Hopkinton, MA (US)

(72) Inventors: Sunil Yadav, Bangalore (IN); Vipin Kumar Kaushal, Bangalore (IN); Gururaj Soma, Bangalore (IN); Shelesh Chopra, Bangalore (IN); Amarendra Behera, Varthur (IN); Yagnavalkya Chennojwala, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

(21) Appl. No.: 15/965,791

(22) Filed: Apr. 27, 2018

(65) Prior Publication Data

US 2019/0334761 A1    Oct. 31, 2019

(51) Int. Cl.
| | |
|---|---|
| G06F 11/00 | (2006.01) |
| G06F 11/14 | (2006.01) |
| H04L 12/24 | (2006.01) |
| G06F 11/08 | (2006.01) |
| H04L 12/26 | (2006.01) |

(Continued)

(52) U.S. Cl.
CPC .......... *G06F 11/1469* (2013.01); *G06F 11/08* (2013.01); *G06F 11/1461* (2013.01); *G06F 11/1464* (2013.01); *G06F 16/128* (2019.01); *H04L 41/0668* (2013.01); *H04L 43/10* (2013.01); *H04L 69/40* (2013.01)

(58) Field of Classification Search
CPC ............ H04L 41/0668; G06F 11/1448; G06F 11/1458; G06F 11/1461; G06F 11/1464; G06F 11/1466; G06F 11/1469; G06F 11/2023
See application file for complete search history.

(56) References Cited

U.S. PATENT DOCUMENTS

| | | | |
|---|---|---|---|
| 8,832,030 B1 * | 9/2014 | Buchman ............ | G06F 11/1451 707/650 |
| 9,934,107 B1 * | 4/2018 | Chikkanayakanahally ................. G06F 11/1456 |
| 10,127,118 B1 * | 11/2018 | Chakraborty ....... | G06F 11/1469 |

(Continued)

*Primary Examiner* — Michael Maskulinski
(74) *Attorney, Agent, or Firm* — Chamberlain, Hrdlicka, White, Williams & Aughtry

(57) ABSTRACT

A method and system for SharePoint single web application recovery. Specifically, the method and system disclosed herein overcome the existing problem of data loss that incurs when a SharePoint farm (SPF) (i.e., or more specifically, the configuration database within the SPF) is restored due to the failure of just a single web application that executes therein. The data loss transpires because restoring the SPF leads to the overwriting of data associated with all web applications, and not just the failed web application, that executes on the SPF. The method and system disclosed herein addresses this dilemma through the assembly of web application topology metadata pertinent to recovering any web application periodically prior to a web application failover event, determining that a web application has entered a failed state and, subsequently, triggering and executing the restoration of just the failed web application based on the determining.

20 Claims, 11 Drawing Sheets

(51) Int. Cl.
*H04L 29/14* (2006.01)
*G06F 16/11* (2019.01)

(56) References Cited

U.S. PATENT DOCUMENTS

2012/0173919 A1* 7/2012 Patel .................. G06F 11/1453
714/4.11
2015/0007169 A1* 1/2015 Li .......................... H04L 67/10
717/177

* cited by examiner

METHOD AND SYSTEM FOR SINGLE WEB APPLICATION RECOVERY ON A COLLABORATIVE PLATFORM

BACKGROUND

Data loss often occurs when SharePoint farms (SPFs) are restored due to the failure of just a single web application that executes therein. Current SPF methodologies cannot target specific web applications when just those web applications experience failover, thereby forcing the restoration of a SPF in entirety, which affects other web applications that may be executing on the SPF.

DETAILED DESCRIPTION

Figure 1:
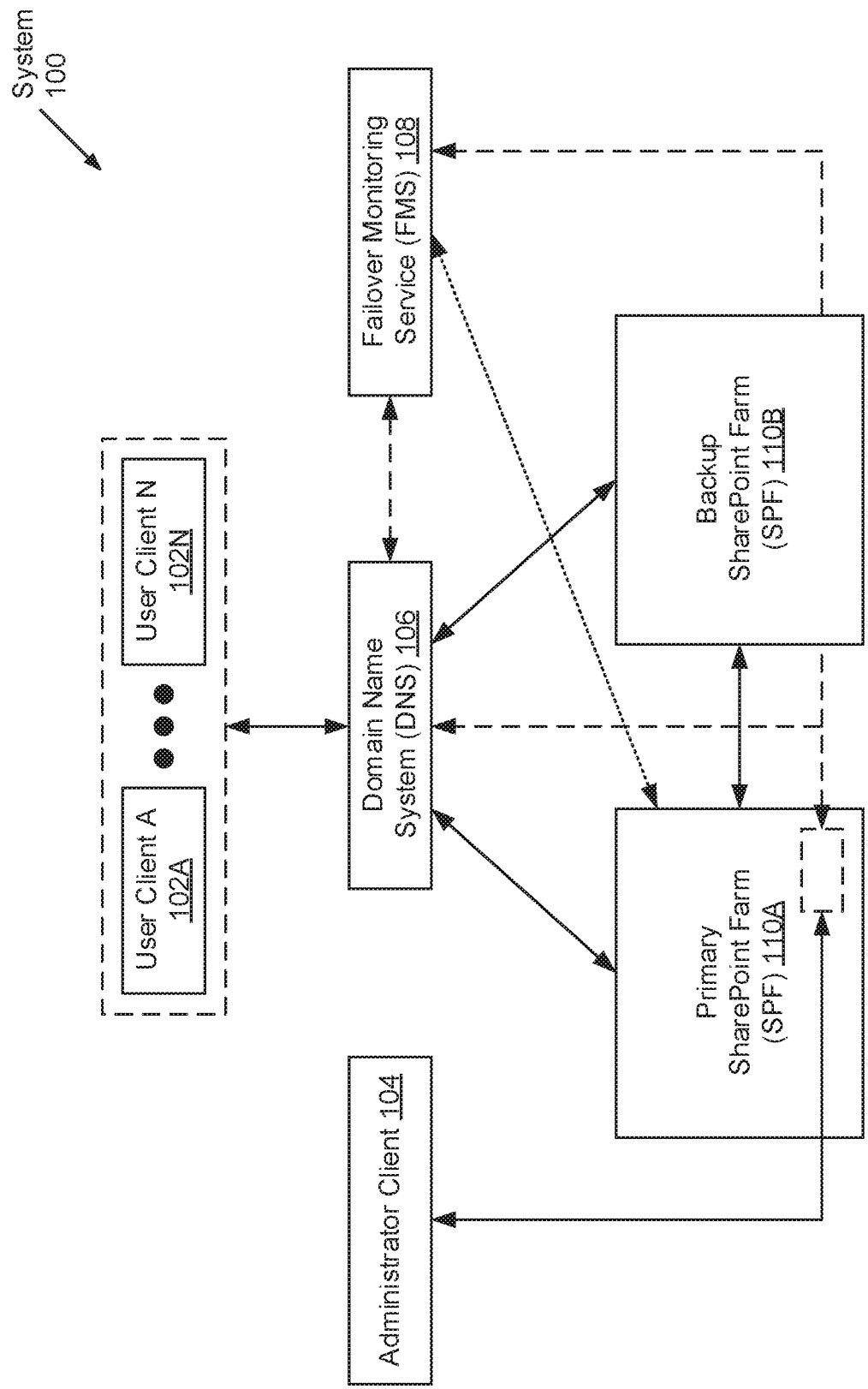
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessary imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for SharePoint single web application recovery. Specifically, one or more embodiments of the invention overcome the existing problem of data loss that incurs when a SharePoint farm (SPF) (i.e., or more specifically, the configuration database within the SPF) is restored due to the failure of just a single web application that executes therein. The data loss transpires because restoring the SPF leads to the overwriting of data associated with all web applications, and not just the failed web application, that executes on the SPF. Therefore, any other web application, which is not the web application for which the restore benefits, may also be coerced to recover, which results in the data loss for those other web applications. The method and system disclosed herein addresses this dilemma through the assembly of web application topology metadata pertinent to recovering any web application periodically prior to a web application failover event, determining that a web application has entered a failed state and, subsequently, triggering and executing the restoration of just the failed web application based on the determining. Through execution of one or more embodiments of the invention, the data loss sustained by other web applications when just one web application needs to be recovered is averted.

One or more embodiments of the invention, hereinafter, may be described with respect to SharePoint and its associated aspects. However, one of ordinary skill in the art will appreciate that the invention may be practiced on any web-based collaborative platform that excludes the capability of enabling the targeted recovery of web applications hosted by the web-based collaborative platform.

FIG. 1 shows a system in accordance with one or more embodiments of the invention. The system (100) may include a primary SharePoint farm (SPF) (110A), a backup SPF (110B), a domain name system (DNS) (106), a failover monitoring service (FMS) (108), an administrator client (104), and one or more user clients (102A-102N). Each of these components is described below.

In one embodiment of the invention, a SPF (110A, 110B) may refer to a collaborative platform farm (CPF) and, thus, may entail a cluster of servers that provide a SharePoint Online experience to multiple end users (i.e., operators of the one or more user clients (102A-102N)). Each server in the cluster of servers may manage a set of tasks that implement at least a portion of the SharePoint Online experience. SharePoint and the SharePoint Online experience pertain to a web-based, collaborative platform introduced by the Microsoft Corporation. Further, the SharePoint Online experience may enable teams of end users to create centralized spaces for sharing and managing content (e.g., documents, media, computer readable program code, etc.). To that end, the SharePoint Online experience may enable teams of end users to, for example, collaborate effectively, secure and share information, upload and download content, track tasks, and manage content. Further, in one embodiment of the invention, each server in the cluster of servers constituting a SPF (110A, 110B) may be a physical server (i.e., in a datacenter) or a virtual server (i.e., that may be cloud-based). In another embodiment of the invention, each server in the cluster of servers may be a computing system similar to the exemplary computing system shown in FIG. 8.

In one embodiment of the invention, the primary SPF (110A) may be a cluster of servers that collectively include functionality to receive and process user client traffic towards supporting the SharePoint Online experience. User client traffic may refer to network traffic originating from the one or more user clients (102A-102N). Substantively, the primary SPF (110A) may be a cluster of servers that is predominantly active, and accordingly, is seldom inactive. Inactivity of the primary SPF (110A) may be caused by various reasons including, but not limited to, scheduled maintenance, unexpected power outages, and failover experienced by the primary SPF (110A) in part or in entirety. Further, with respect to failover, the primary SPF (110A) may undergo failover for multiple reasons such as, for example, hardware failure, data corruption, and/or software anomalies introduced through cyber security attacks/threats. The primary SPF (110A), and SPFs in general, are described in further detail below with respect to FIG. 2A.

In one embodiment of the invention, the backup SPF (110B) may be another cluster of servers that, like the primary SPF (110A), collectively include functionality to receive and process user client traffic towards supporting the SharePoint Online experience. However, unlike the primary SPF (110A), the backup SPF (I 10B) may be a cluster of servers that is predominantly inactive, and accordingly, is seldom active. Specifically, the backup SPF (110B) may be activated, thereby assuming responsibilities of the primary SPF (110A), when the primary SPF (110A) experiences inactivity due to at least one of the above-mentioned reasons. Substantively, the primary SPF (110A) and the backup SPF (110B) are bound by an active-passive (or active-standby) configuration.

In one embodiment of the invention, the cluster of servers constituting the backup SPF (110B) may reside in one or more different physical locations than the physical location(s) within which the cluster of servers constituting the primary SPF (110A) may reside. This distribution of the servers may be a tactic employed for mitigating the effects of unexpected power outages and cyber security attack/threat intrusions that may be inflicted on any one particular physical site. Further, in one embodiment of the invention, the cluster of servers constituting the backup SPF (110B) may specify the same or different configuration of resources (e.g., compute, storage, and/or network resources) as that which may be specified on the cluster of servers constituting the primary SPF (110A).

In one embodiment of the invention, the backup SPF (110B) may retain the exact same information (e.g., configuration-related settings, web application content, user account information, etc.) that may also be stored on the primary SPF (110A) at any given time. Synchronization of information between the primary SPF (110A) and the backup SPF (110B) may be facilitated by any one or more existing data synchronization mechanisms and/or protocols. By way of an example, the primary SPF (110A) and backup SPF (110B) may share information with one another directly (i.e., without going through an intermediary). In this scenario, the primary and backup SPFs (110A, 110B) may include functionality to employ one or more tunneling protocols (e.g., secure shell (SSH) tunneling, Internet control message protocol (ICMP) tunneling, virtual extensible local area network (VXLAN) tunneling, virtual private network (VPN) tunneling, hypertext transfer protocol (HTTP) tunneling, etc.) for enabling information exchange. By way of another example, the primary SPF (110A) and backup SPF (110B) may share information with one another indirectly (i.e., traversing through an intermediary). In this scenario, the intermediary may encompass, for example, a management stack (not shown), a cloud-based consolidation and/or forwarding point (not shown), or a third-party service (not shown). Further, in this scenario, sharing of information between the primary and backup SPFs (110A, 110B) may entail the SPFs (110A, 110B) uploading information to the intermediary, which in turn may disseminate the uploaded information to the respective peer SPFs (110A, 110B).

In one embodiment of the invention, the primary SPF (110A) may share information with the backup SPF (110B) regularly or periodically as part of data backup operations executing on the primary SPF (110A). On the other hand, the backup SPF (110B) may share information with the primary SPF (110A) when the backup SPF (110B) assumes the responsibilities of the primary SPF (110A) (i.e., upon the primary SPF (110A) becoming inactive) and after the primary SPF (110A) has become available (or active) again. In either case, the shared information may be transferred to a peer SPF (110A, 110B) as snapshots of the entire SPF or incremental changes across at least a portion of the SPF.

In one embodiment of the invention, the DNS (106) may be a web-based service that includes functionality to resolve or translate domain names into Internet Protocol (IP) addresses. A domain name may be an identification string that is directed to a web-accessible resource (e.g., an Internet-enabled computer, a server hosting a website, a website itself, a service facilitated by the Internet, content stored in a network-enabled storage system, etc.). Domain names may be expressed as uniform resource locators (URLs) (e.g., "www.example.com"). Further, an IP address may be an identification string assigned to any physical and/or virtual device connected to an IP-enabled network. An IP address not only identifies the device but also specifies a location of the device in the IP-enabled network. Presently, IP addresses conform to the IP version 4 (IPv4) addressing standard (e.g., "192.168.1.15/24") or the IP version 6 (IPv6) addressing standard (e.g., "2001:db8:0:1234:0:567:8:1").

In one embodiment of the invention, the DNS (106) may be implemented on one or more servers (not shown). Each server may be a physical server (i.e., in a datacenter) or a virtual server (i.e., that may be cloud-based). In another embodiment of the invention, the DNS (106) may be implemented on one or more computing systems similar to the exemplary computing system shown in FIG. 8. Furthermore, in one embodiment of the invention, the DNS (106) may include one or more data repositories or media (not shown) for consolidating various domain name to IP address mappings (i.e., also known as DNS entries). Moreover, using these mappings, the DNS (106) may include further functionality to route network traffic towards an appropriate destination in an IP-enabled network.

In one embodiment of the invention, any mapping stored in the DNS (106) may map a domain name to one IP address or multiple IP addresses. When presented with one IP address, directed to a primary endpoint (e.g., the primary SPF (110A)), and a failover event is being mitigated, the mapping may require modification to specify another IP address directed to a secondary endpoint (e.g., the backup SPF (110B)). Modification of the mapping may be performed by the DNS (106) at the behest of: a redirect request (including the another IP address) from the primary SPF (110A); or a notification (including the another IP address) from the FMS (108). Upon the primary SPF (110A) recovering from experiencing failover, the mapping may be modified once more to specify the original IP address directed to the primary endpoint. When presented with multiple IP addresses, directed to a primary endpoint and at least one secondary endpoint, and a failover event is being mitigated, the DNS (106) may include functionality to switch between specified IP addresses based on a status monitoring of the primary and/or secondary endpoints. The status monitoring of the primary and/or secondary endpoints may be fulfilled by an internal monitoring service provided by the DNS (106), or alternatively, by an external monitoring service (e.g., the FMS (108)).

In one embodiment of the invention, the FMS (108) may be an external (or third-party) service for monitoring SPF (110A, 110B) statuses. SPF statuses may be monitored towards redirecting user client traffic when the primary SPF (110A) experiences periods of inactivity or when the primary SPF (110A) resumes normal operations after recovery. In one embodiment of the invention, the FMS (108) may be implemented on one or more servers (not shown). Each server may be a physical server (i.e., residing in a datacenter) or a virtual server (i.e., which may be cloud-based). In another embodiment of the invention, the FMS (108) may be implemented on one or more computing systems similar to the exemplary computing system shown in FIG. 8. Furthermore, towards monitoring SPF statuses, the FMS (108) may include functionality to ping a SPF (110A, 110B) for a response, send heartbeat packets to a SPF (110A, 110B) for a response, check whether content is being served on web applications hosted by a SPF (11A, 110B), check a status script for and residing on a SPF (110A, 110B) for changes in status, and/or receive status notifications from a SPF (110A, 110B). Thereafter, based on the status of a SPF (110A, 110B), the FMS (108) may include further functionality to modify mappings or DNS entries of the DNS (106) to redirect user client traffic accordingly.

In one embodiment of the invention, the administrator client (104) may be any computing system (see e.g., FIG. 8) operated by an administrator of the primary and/or backup SPFs (110A, 110B). An administrator of the SPFs (110A, 110B) may be an individual (or a group of individuals) who may be responsible for overseeing operations and maintenance pertinent to the clusters of servers, software, and/or firmware (i.e., collectively, the SharePoint Online experience) that constitute the SPFs (110A, 110B). Further, the administrator client (104) may include functionality to: submit restore requests to at least the primary SPF (110A), where the restore requests may be directed to initiating SharePoint web application recovery in accordance with one or more embodiments of the invention; and receive restore responses, from at least the primary SPF (110A), which may report on the outcome resulting from processing the submitted restore requests. One of ordinary skill will appreciate that the administrator client (104) may perform other functionalities without departing from the scope of the invention. Examples of the administrator client (104) include, but are not limited to, a desktop computer, a laptop computer, a tablet computer, a server, a mainframe, a smartphone, or any other computing system similar to the exemplary computing system shown in FIG. 8.

In one embodiment of the invention, a user client (102A-102N) may be any computing system (see e.g., FIG. 8) operated by a user of the SharePoint Online experience (described above). A user client (102A-102N) may include functionality to: submit application programming interface (API) requests to the primary and/or backup SPFs (110A, 110B), where the API requests may be directed to, for example, sharing information, uploading and downloading content, tracking tasks, and managing content associated with one or more SharePoint web applications; and receive API responses, from the SPFs (110A, 110B), which may provide resources or report on the outcome resulting from processing the submitted API requests. One of ordinary skill will appreciate that a user client (102A-102N) may perform other functionalities without departing from the scope of the invention. Examples of a user client (102A-102N) include, but are not limited to, a desktop computer, a laptop computer, a tablet computer, a server, a mainframe, a smartphone, or any other computing system similar to the exemplary computing system shown in FIG. 8.

In one embodiment of the invention, two or more of the above-described system (100) components may be directly or indirectly connected to one another through a network (not shown) (e.g., a local area network (LAN), a wide area network (WAN) such as the Internet, a mobile network, etc.). The network may be implemented using any combination of wired and/or wireless connections. In embodiments in which the system (100) components are indirectly connected, there may be other networking components or systems (e.g., switches, routers, gateways, etc.) that facilitate communications and/or information exchange. Further, the system (100) components may communicate with one another using any combination of wired and/or wireless communication protocols.

While FIG. 1 shows a configuration of components, other system configurations may be used without departing from the scope of the invention. For example, the system (100) may include additional backup SPFs (110B) to further mitigate failover and/or disaster recovery events.

Figure 2A:
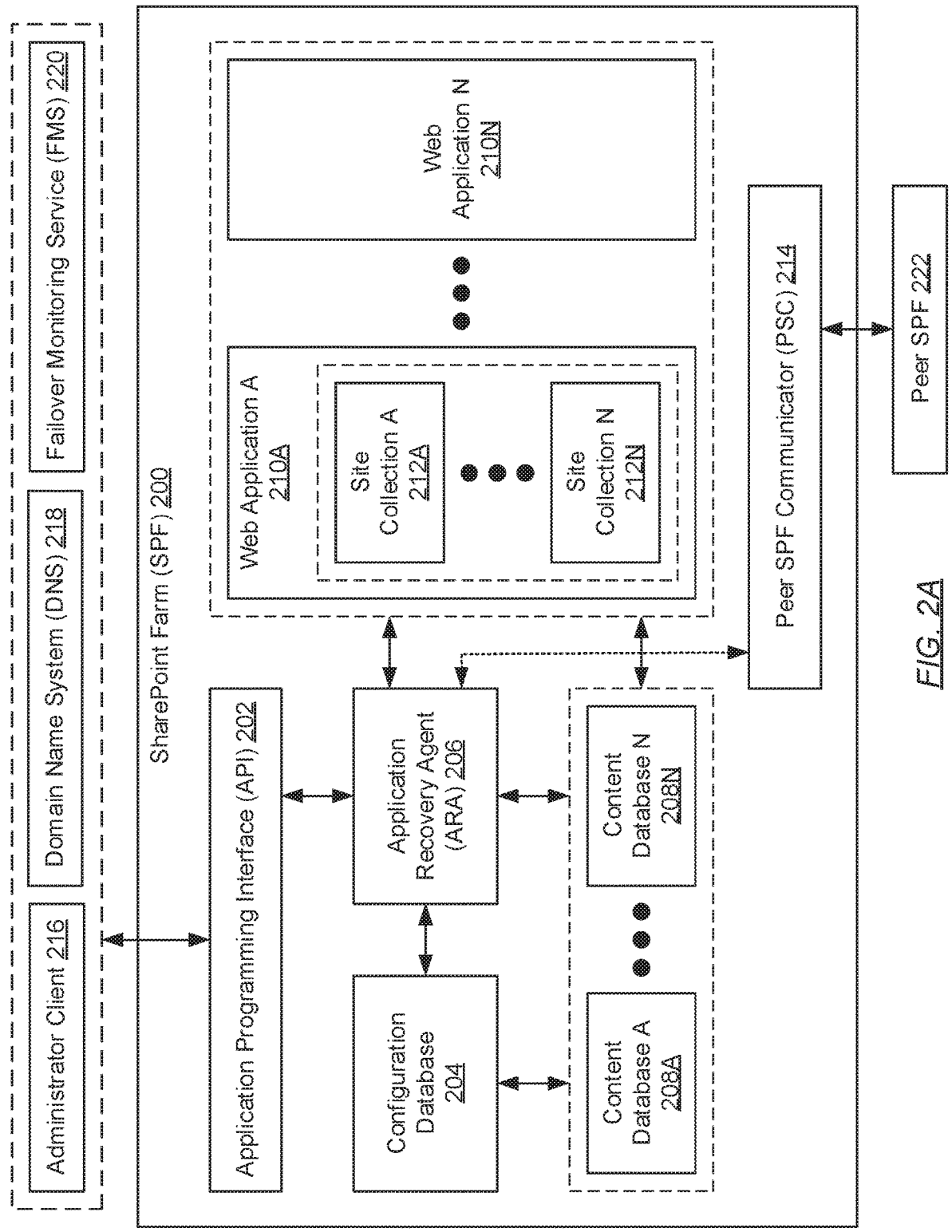
FIG. 2A shows a SharePoint farm in accordance with one or more embodiments of the invention.

FIG. 2A shows a SharePoint farm (SPF) in accordance with one or more embodiments of the invention. As described above, physically, a SPF (200) may be a cluster of servers that provide a SharePoint Online experience to multiple end users (i.e., operators of the one or more user clients). Logically, however, a SPF (200) may include an application programming interface (API) (202), a configuration database (204), an application recovery agent (ARA) (206), one or more content databases (208A-208N), one or more (SharePoint) web applications (210A-210N), and a peer SPF communicator (PSC) (214). Each of these components is described below.

In one embodiment of the invention, the API (202) may be a hardware and/or software implemented construct that employs a set of subroutine definitions, protocols, and/or tools for enabling communication and/or information exchange between the SPF (200) and one or more external entities (e.g., the administrator client (216), the domain name system (DNS) (218), and/or the failover monitoring service (FMS) (220) (described above)). By way of an example, the API (202) may be a web API, which may be accessed through an assigned web address (e.g., a uniform resource locator (URL)) and a WAN (e.g., Internet) connection.

In one embodiment of the invention, the configuration database (204) may be a storage system or media for consolidating information pertinent to the centralized management of the SPF (200). Information consolidated in the configuration database (204) may include, but is not limited to: SPF settings, server resources inventory, web application user account information, SPF administrator account information, peer SPF network address information (i.e., used towards enabling failover or disaster recovery event mitigation), web application specific settings, server address information, etc. In one embodiment of the invention, the configuration database (204) may span logically across one or more physical storage units and/or devices, which may or may not be of the same type or co-located in a same physical server. Further, information consolidated in the configuration database (204) may be arranged using any storage mechanism (e.g., a filesystem, a collection of tables, etc.). In one embodiment of the invention, the configuration database (204) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, the ARA (206) may be one or multiple computer programs, or computer processes (i.e., instances of a computer program), that execute on the underlying hardware of the SPF (200). Specifically, the ARA (206) may be computer programs or processes that may, collectively, be tasked with implementing SharePoint single web application recovery in accordance with one or more embodiments of the invention. More specifically, the ARA (206) may include functionality to: assemble, store, and backup application topology metadata (ATM) objects (described below) associated with one or more web applications (210A-210N) (see e.g., FIG. 5); detect failover occurring to one or more web applications (210A-210N) (see e.g., FIGS. 6A and 6B); and execute a procedure for restoring one or more web applications (210A-210N) without restoring the SPF (200) in entirety (see e.g., FIGS. 7A and 7B). The ARA (206) is described in further detail below with respect to FIG. 3.

In one embodiment of the invention, a content database (208A-208N) may be a storage system or media for consolidating web application content associated with (or otherwise presented/shared through) one or more web applications (210A-210N). Content consolidated in a content database (208A-208N) may include, but is not limited to: documents, images, multimedia, computer readable program code, etc. In one embodiment of the invention, a content database (208A-208N) may span logically across one or more physical storage units and/or devices, which may or may not be of the same type or co-located in a same physical server. Further, content consolidated in a content database (208A-208N) may be arranged using any storage mechanism (e.g., a filesystem, a collection of tables, etc.). In one embodiment of the invention, a content database (208A-208N) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, a web application (210A-210N) may be an interface through which one or more end users may interact with the SharePoint Online experience (described above). More generally, a web application (210A-210N) may be a software application that may be accessed over a network connection using a web browser. Further, a web application (210A-210N) may serve as a medium through which content may be created, deleted, edited, viewed, and/or shared by and amongst the one or more end users associated with the web application (210A-210N). In one embodiment of the invention, a web application (210A-210N) may be an Internet Information Services (IIS) website configured to run SharePoint. Moreover, in one embodiment of the invention, a web application (210A-210N) may include one or more site collections (212A-212N). A site collection (212A-212N) may be a data object or structure (i.e., a logical container) for grouping one or more sites (described below) which, further, may support the hierarchical arrangement of the site(s) therein. Site collections (212A-212N) are described in further detail below with respect to FIG. 2B.

In one embodiment of the invention, the PSC (214) may be a physical and/or virtual network interface, which may employ one or more network protocols to facilitate communications and/or information exchange between the SPF (200) and one or more peer SPFs (222). The PSC (214) may also facilitate communications and/or information exchange between the SPF (200) and an intermediary (described above) (not shown). In one embodiment of the invention, the PSC (214) may include functionality to employ one or more tunneling protocols (e.g., secure shell (SSH) tunneling, Internet control message protocol (ICMP) tunneling, virtual extensible local area network (VXLAN) tunneling, virtual private network (VPN) tunneling, hypertext transfer protocol (HTTP) tunneling, etc.) towards facilitating said communications and/or information exchange. Examples of the PSC (214) include, but are not limited to: a network interface card/controller (NIC), a computer port, a network interface device, a network socket, and a virtual tunnel endpoint (VTEP).

Figure 2B:
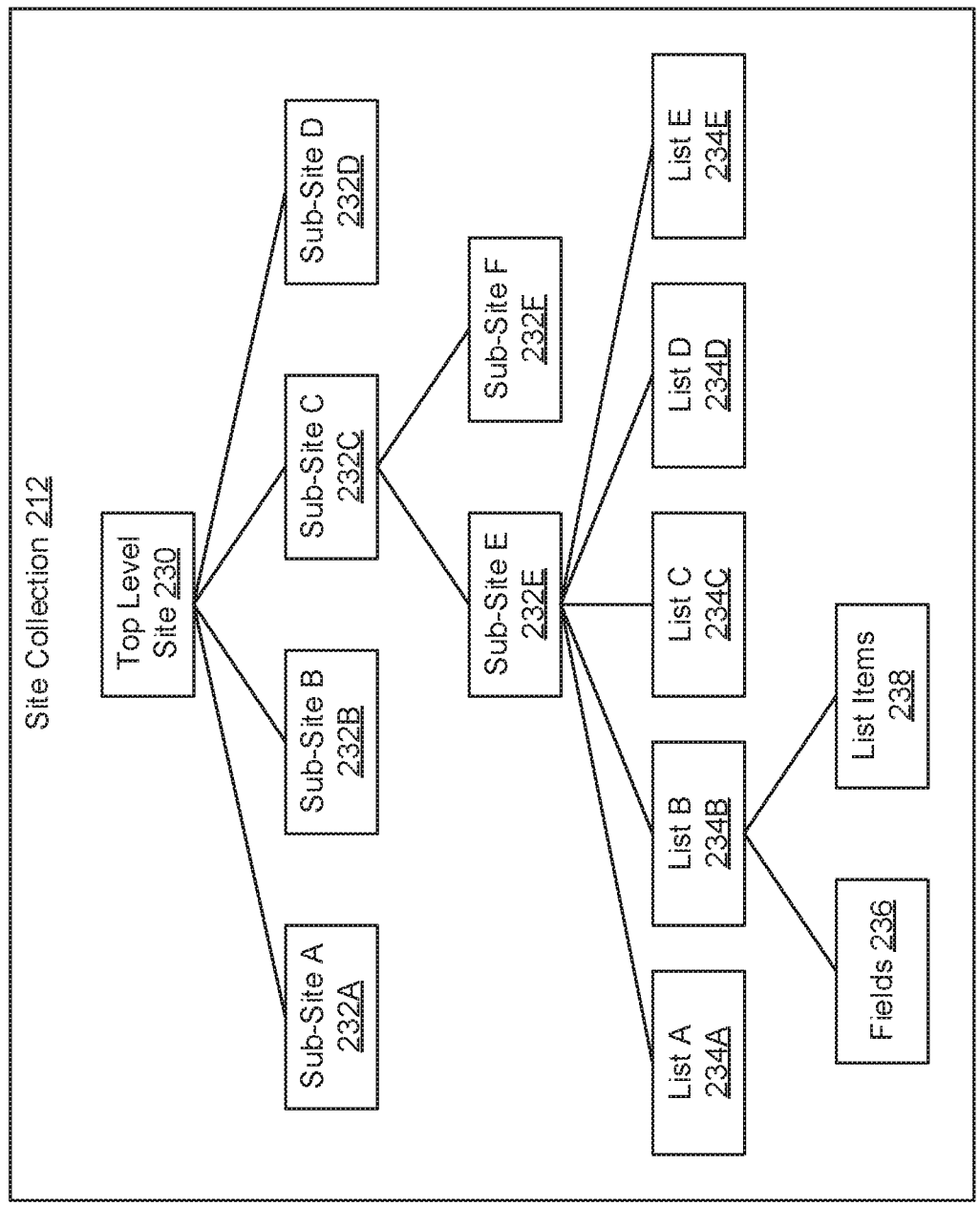
FIG. 2B shows a site collection in accordance with one or more embodiments of the invention.

FIG. 2B shows a site collection in accordance with one or more embodiments of the invention. The site collection (212) may be a data object or structure (i.e., a logical container) for grouping and hierarchically arranging one or more sites. The site collection (212) includes a top level site (230) and zero or more sub-sites (232A-232F), where each site may include one or more lists (234A-234E) that specify at least one field (236) and one or more list items (238). Each of these components is described below.

In one embodiment of the invention, a site (i.e., a top level site (230) or a sub-site (232A-232F)) may generally be a complete website, or a collection of related webpages, including content, which may be identified by a unique domain name (described above) (e.g., a uniform resource locator (URL)). The top level site (230) may be a first (or root) site introduced into the site collection (212). Further, a sub-site (232A-232F) may be a logical partition of the top level site (230) or another sub-site (232A-232F). The hierarchical relationship between the top level site (230) and the sub-sites (232A-232F) may be analogous to drives and directories, where the top level site (230) may correlate to the root directory in a drive and where each sub-site (232A-232F) may correlate to a sub-directory under the root directory or other nested sub-directories.

In one embodiment of the invention, a list (234A-234E) may be a data object or structure (i.e., a logical container) for storing and/or tracking information shared across the site(s) of the site collection (200) and amongst the one or more end users associated with the web application (210A-210N). Examples of stored/tracked information include, but are not limited to, information pertaining to tasks, contacts, links, announcements, surveys, discussion boards, issues, and calendars. In one embodiment of the invention, the fields (236) and list items (238) of a list (234A-234E) may be comparable to the columns and rows, respectively, of a structured query language (SQL) database table, which when crossreferenced, stores/reveals a specific piece of information that may be stored/tracked on a list (234A-234E).

Figure 3:
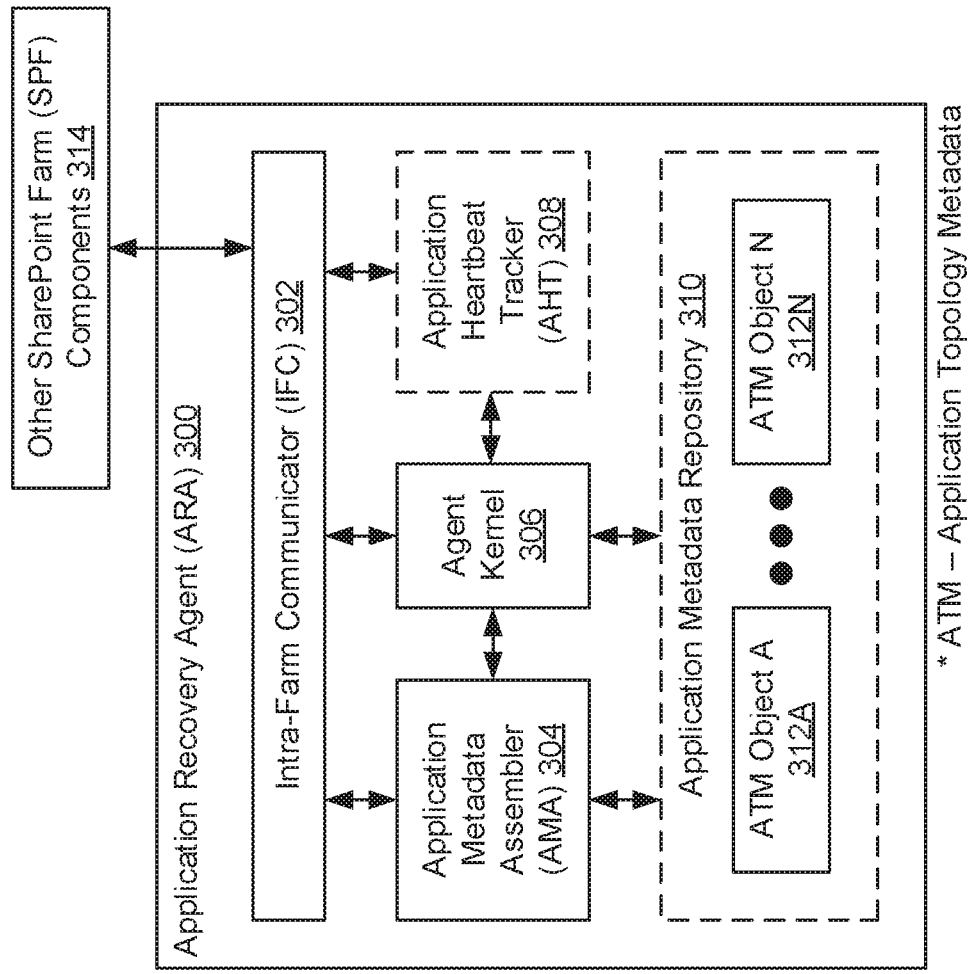
FIG. 3 shows an application recovery agent in accordance with one or more embodiments of the invention.

FIG. 3 shows an application recovery agent (ARA) in accordance with one or more embodiments of the invention. As described above, the ARA (300) may be one or multiple computer programs/processes that implement SharePoint single web application recovery. To that end, the ARA (300) may include an intra-farm communicator (IFC) (302), an application metadata assembler (AMA) (304), an agent kernel (306), an application heartbeat tracker (AHT) (308) (optionally), and an application metadata repository (310) (optionally). Each of these components is described below.

In one embodiment of the invention, the IFC (302) may be a physical device or a computer process (i.e., an instance of a computer program) tasked with enabling intra-farm communications and/or information exchange between the ARA (300) and one or more other SharePoint farm (SPF) components (314). For example, the IFC (302) may facilitate communications and/or information exchange between the ARA (300) and: the application programming interface (API); the configuration database; one or more content databases; one or more web applications; and the peer SPF communicator (PSC) (see e.g., FIG. 2A). Further, the IFC (302) may employ any set of subroutine definitions, protocols, and/or tools directed to achieving the communication and/or information exchange facilitation.

In one embodiment of the invention, the AMA (304) may be a computer process (i.e., an instance of a computer program) tasked with assembling application topology metadata (ATM) objects (312A-312N). To that end, the AMA (304) may include functionality to: gather application recreation information (ARI) (described below) pertaining to one or more web applications; and, subsequently, generate the ATM objects (312A-312N) using the ARI. Further details directed to ATM object assembly are described below with respect to FIG. 5.

In one embodiment of the invention, the agent kernel (306) may be a computer process (i.e., an instance of a computer program) tasked with overseeing ARA (300) operations. That is, the agent kernel (306) may include functionality to: supervise other components implementing the ARA (300)—e.g., the IFC (302), the AMA (304), the AHT (308), and the application metadata repository (310); coordinate information exchange amongst the ARA (300) components (including itself); manage or process communications between the ARA (300) and other SPF components (314); and perform other general or housekeeping routines pertinent to ARA (300) functionality. In one embodiment of the invention, the agent kernel (306) may implement, at least in part, SharePoint single web application recovery as substantively outlined in FIGS. 7A and 7B below.

In one embodiment of the invention, the AHT (308) may be a computer process (i.e., an instance of a computer program) tasked with monitoring the health or status of one or more web applications. To that end, the AHT (308) may include functionality to: issue heartbeat packets (described below) to one or more web applications; listen for heartbeat responses from the web application(s); and determine, based on the receiving or not of heartbeat responses, the statuses of the web application(s). Further details directed to web application status monitoring are described below with respect to FIGS. 6A and 6B.

In one embodiment of the invention, the application metadata repository (310) may be a storage system or media for consolidating one or more ATM objects (312A-312N). An ATM object (312A-312N) may refer to a data object or structure (i.e., a logical container) for storing application recreation information (ARI) pertaining to any particular web application executing on a SPF. ATM objects (312A-312N) are described in further detail below with respect to FIG. 4. In one embodiment of the invention, the application metadata repository (310) may span logically across one or more physical storage units and/or devices, which may or may not be of the same type or co-located in a same physical server. Further, the ATM objects (312A-312N) consolidated in the application metadata repository (310) may be arranged using any storage mechanism (e.g., a filesystem, a collection of tables, etc.). In one embodiment of the invention, the application metadata repository (310) may be implemented using persistent (i.e., non-volatile) storage media. database (204) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

Figure 4:
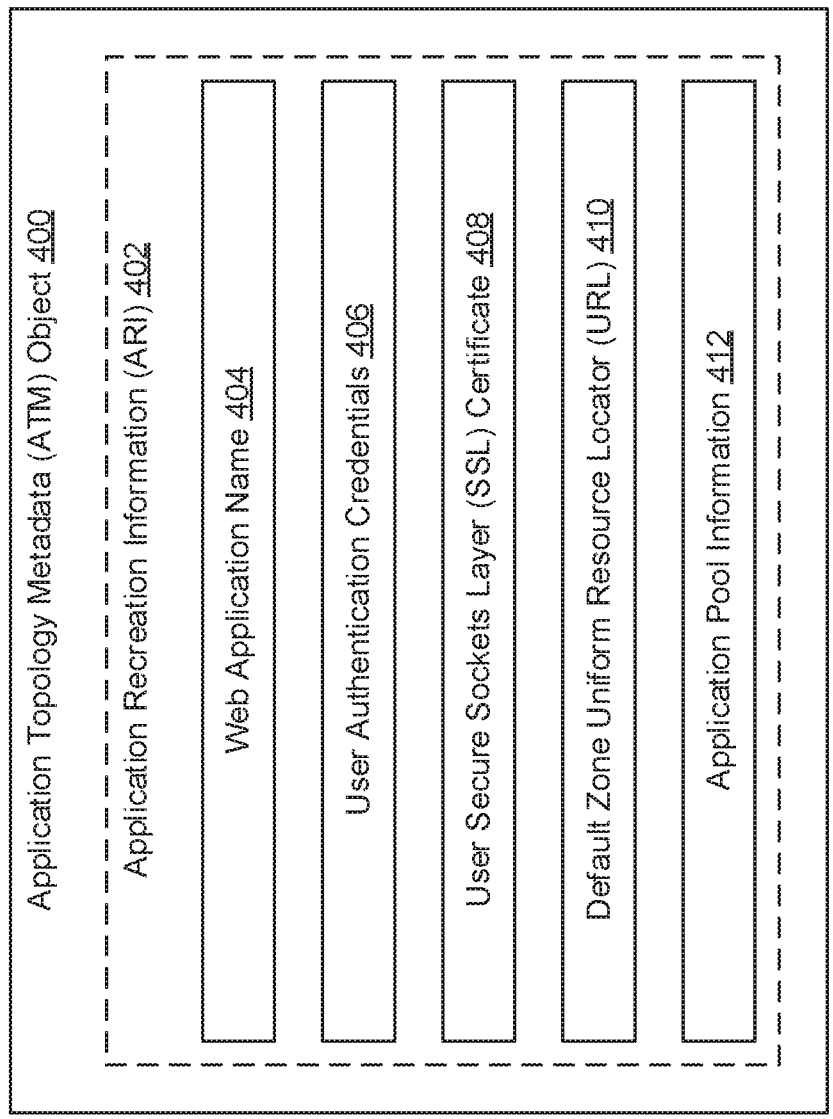
FIG. 4 shows an application topology metadata object in accordance with one or more embodiments of the invention.

FIG. 4 shows an application topology metadata (ATM) object in accordance with one or more embodiments of the invention. As described above, an ATM object (400) may refer to a data object or structure, and hence, a logical container, for consolidating application recreation information (ARI) (402) pertinent to any particular web application. ARI (402) may represent web application information critical towards enabling SharePoint single web application recovery without full SPF restoration. Furthermore, ARI (402) may be an aggregation of at least the following items of information: a web application name (404), user authentication credentials (406), user secure sockets layer (SSL) certificate(s) (408), a default zone uniform resource locator (URL) (410), and application pool information (412). Each of these items of information is described below.

In one embodiment of the invention, the web application name (404) may refer to a string of characters (e.g., letters, numbers, symbols, etc.) that may be used uniquely identify the web application associated with the ATM object (400). The web application name (404) may entail any number and/or combination of characters. By way of an example, the web application name (404) may be represented through an alphanumeric tag (i.e., provided by users of the web application) or a N-bit integer (where N>0) (i.e., provided by the application metadata assembler (AMA) (see e.g., FIG. 3)), which may be expressed in hexadecimal notation. With respect to SharePoint single web application recovery, the web application name (404) may be significant in identifying the web application to which the ARI (402) pertains. Further, during recovery of a web application, the web application name (404) may be used to select or obtain the appropriate ATM object (400) necessary to restore the web application.

In one embodiment of the invention, a user authentication credential (406) may refer to a digital object—e.g., data file—used to verify the identity of a user for authentication. By way of an example, the user authentication credential may be a new technology (NT) local area network (LAN) manager (NTLM) authentication credential. NTLM may be a challenge-response authentication and session security protocol, which is well-known in the art—details of which lie outside the scope of the invention. With respect to SharePoint single web application recovery, however, user authentication credentials may be significant because, in being Internet Information Services (ITS) websites, SharePoint web applications tend to be secure, thereby requiring authentication credentials. In one embodiment of the invention, IIS settings (e.g., authentication credentials) pertaining to a web application may be backed up and, subsequently, restored when recovering the web application. In another embodiment of the invention, instead of backing up and restoring existing authentication credentials, one or more users may be prompted to provide new authentication credentials.

In one embodiment of the invention, a user SSL certificate (408) may refer to a digital object—e.g., data file—used to create a secure link between a user client (see e.g., FIG. 1) and the web application to which the ARI (402) pertains. SSL certificates (408) serve two functions: (a) to authenticate the identity of the web application; and (b) to encrypt data exchanged between the web application and the user client(s). SSL certificates (408) are well-known in the art—details of which lie outside the scope of the invention. With respect to SharePoint single web application recovery, however, user SSL certificates (408) may be significant in maintaining web application security.

In one embodiment of the invention, the default zone URL (410) may refer to a URL associated with the default zone of the web application to which the ARI (402) pertains. A default zone may be a default logical path through which users gain access to the web application. The default zone URL (410) thus represents a property of the default zone, by which the default zone may be accessed. In one embodiment of the invention, the default zone URL (410) may be an identification string that is directed to a web-accessible resource (i.e., the web application).

In one embodiment of the invention, application pool information (412) may refer to information pertinent to an application pool assigned to the web application to which the ARI (402) pertains. An application pool may be an Internet Information Services (IIS) concept, which may be directed to a container associated with the web application that serves to isolate the web application from other web applications that may be executing on a same physical server. Further, in one embodiment of the invention, an application pool may define a set of web applications that share one or more worker processes, which provide a convenient way to administrate a set of sites. Moreover, application pool information (412) may be segmented into application pool availability information, application pool configuration information, and application pool recycling information, which are all well-known aspects under IIS—details of which lie outside the scope of the invention.

Figure 5:
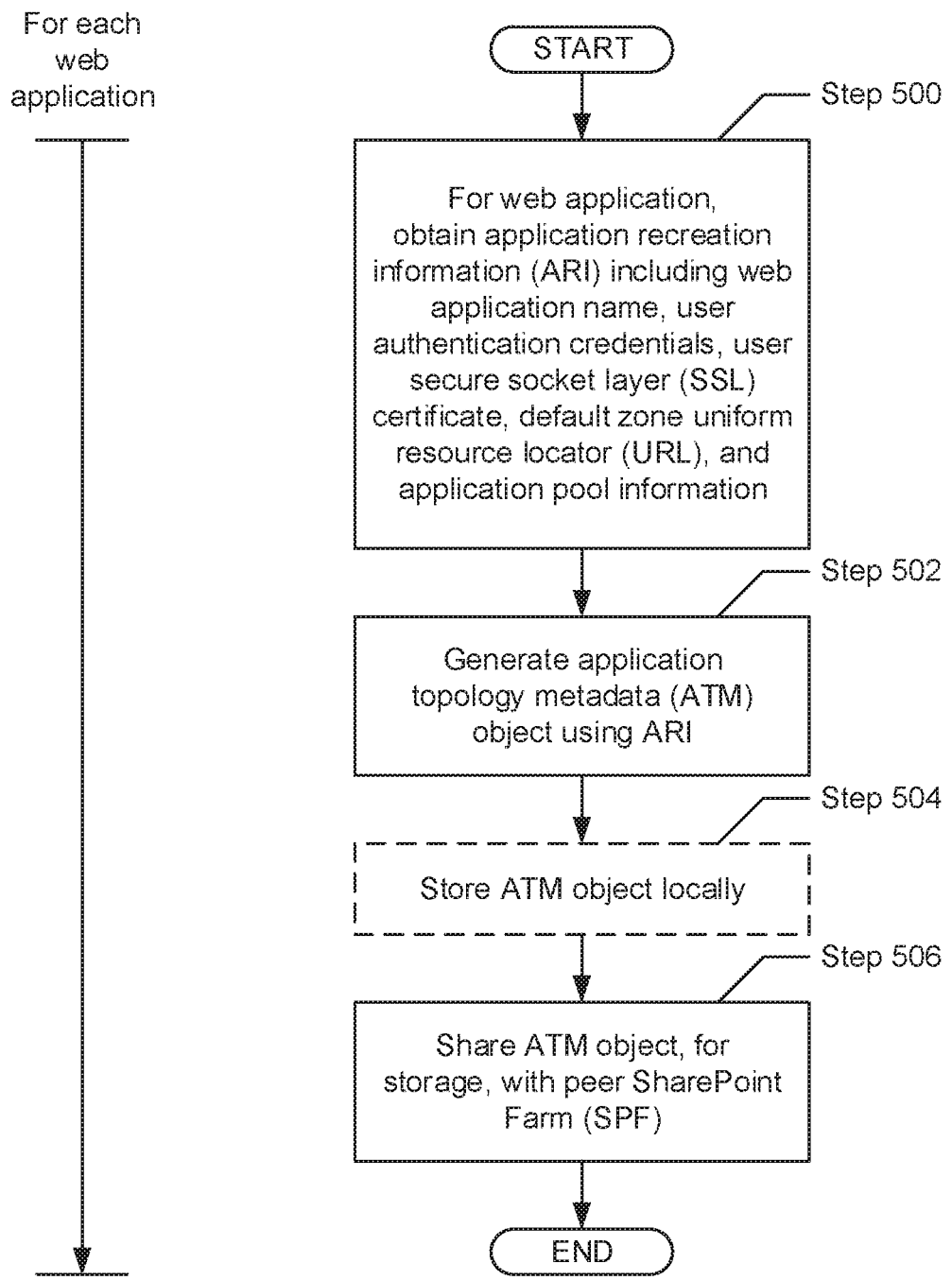
FIG. 5 shows a flowchart describing a method for assembling an application topology metadata object in accordance with one or more embodiments of the invention.

FIG. 5 shows a flowchart describing a method for assembling an application topology metadata (ATM) object in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIG. 5 may be performed in parallel with any other steps shown in FIGS. 6A-7B without departing from the scope of the invention.

Turning to FIG. 5, in Step 500, for each web application residing on an active SharePoint farm (SPF) (i.e., a primary SPF before failover or a backup SPF while the primary SPF undergoes failover), application recreation information (ARI) is obtained for the web application. In one embodiment of the invention, ARI may entail various items of information that may be found across the active SPF ecosystem. These various items of information may include, but are not limited to: a web application name assigned to the web application; one or more user authentication credentials identifying one or more end users of the web application; one or more user secure sockets layer (SSL) certificates that secure links between one or more user clients (see e.g., FIG. 1) and the web application; a default zone uniform resource locator (URL) associated with the web application; and application pool information isolating the web application from other web applications. Further details pertaining to each of these above-mentioned items of information are described above with respect to FIG. 4.

In Step 502, for each web application, an application topology metadata (ATM) object is generated using the ARI for the web application (aggregated in Step 500). In one embodiment of the invention, an ATM object may be a data object or structure (i.e., a logical container) that consolidates the various items of information that collectively represent the ARI.

In Step 504, the ATM object (generated for each web application in Step 502) may optionally be stored locally. Specifically, in one embodiment of the invention, the ATM object(s) may be stored in the application metadata repository residing within the application recovery agent (ARA) (see e.g., FIG. 3). Thereafter, in Step 506, the ATM object (generated for each web application in Step 502) is shared with one or more peer SPFs operatively connected to the active SPF. In one embodiment of the invention, the ATM object(s) may be encoded and transmitted, through a network, towards an intermediary (described above), which in turn may forward the ATM object(s) to the peer SPF(s). In another embodiment of the invention, the ATM object(s) may be encoded and transmitted, through the network, directly towards the peer SPF(s). Peer SPFs may include one or more backup SPFs when the active SPF is: the primary SPF; another backup SPF when the active SPF is a backup SPF which has assumed the responsibilities of the primary SPF which may be undergoing failover; or the primary SPF when the active SPF is a backup SPF which may be sharing information with the primary SPF which has recovered and resumed its responsibilities.

Figure 6A:
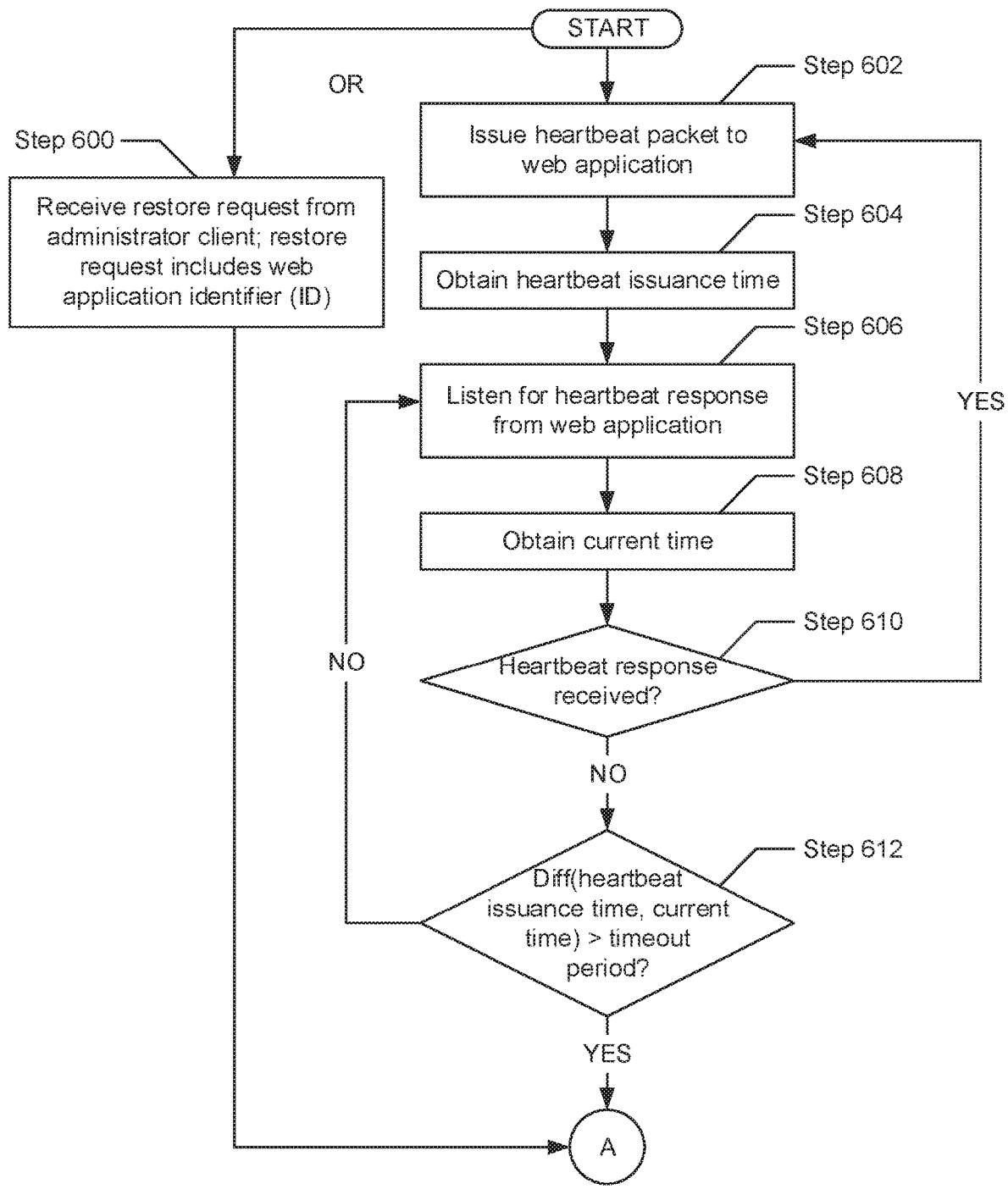
FIGS. 6A and 6B show flowcharts describing a method for detecting SharePoint web application failover in accordance with one or more embodiments of the invention.
Figure 6B:
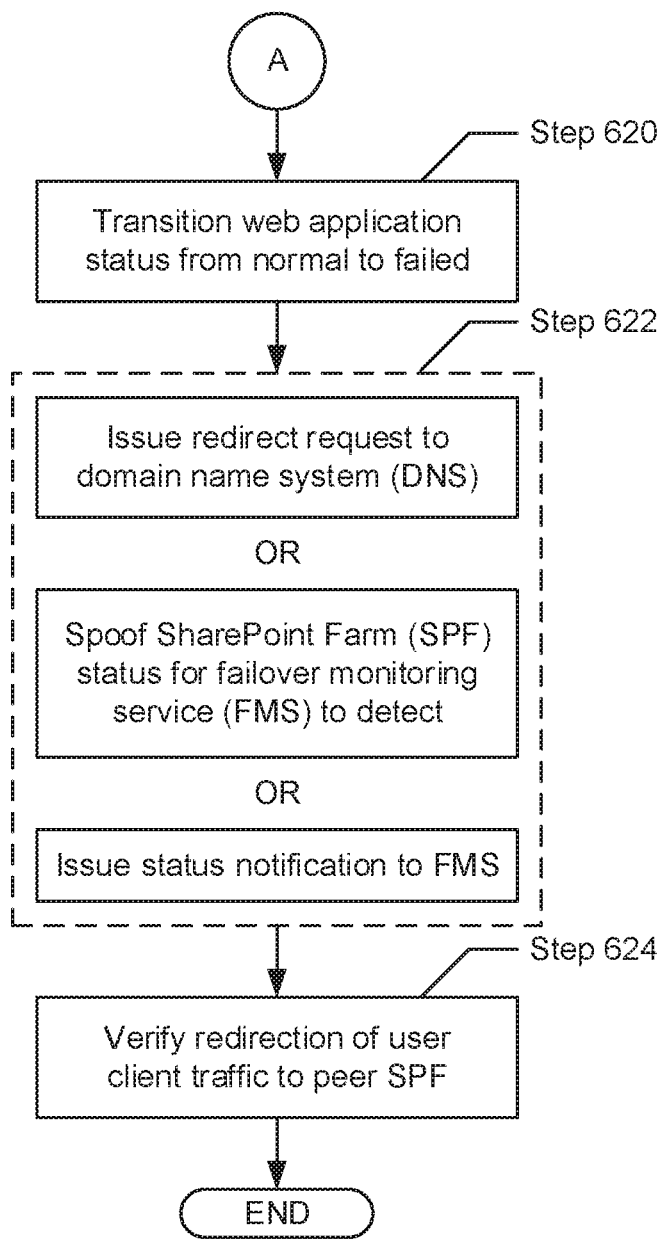

FIGS. 6A and 6B show flowcharts describing a method for detecting SharePoint web application failover in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 6A and 6B may be performed in parallel with any other steps shown in FIGS. 5, 7A, and 7B without departing from the scope of the invention.

Turning to FIG. 6A, two mechanisms for detecting SharePoint web application failover are depicted: (a) a first mechanism entailing Step 600; and (b) a second mechanism entailing Steps 602 through 612. Referring to the first mechanism, in Step 600, a restore request is received from an administrator client (see e.g., FIG. 1). In one embodiment of the invention, the restore request may include a web application identifier (ID)—e.g., the web application name (see e.g., FIG. 4)—associated with a web application residing on an active SharePoint farm (SPF). The web application may be experiencing failover (e.g., is unresponsive, is exhibiting abnormal behavior, etc.) induced by, for example, data corruption or other affects introduced by cyber security attacks/threats. After receiving the restore request, the process proceeds to Step 620 (see e.g., FIG. 6B).

Referring to the second mechanism, in Step 602, a heartbeat packet is issued to a web application residing on an active SPF. In one embodiment of the invention, a heartbeat packet may refer to a type of an intra-farm communication packet sent between an application recovery agent (ARA) (see e.g., FIGS. 2A and 3) and one or more web applications. Further, the heartbeat packet may serve to monitor the health or status of a web application. In Step 604, a heartbeat issuance time is obtained. In one embodiment of the invention, the heartbeat issuance time may be a timestamp identifying when (e.g., date and time) the heartbeat packet had been created or issued. The heartbeat issuance time may be stored in an in-memory data structure residing on the active SPF and/or the ARA.

In Step 606, after issuing the heartbeat packet, a corresponding heartbeat response is listened for from the web application. In Step 608, while still listening for the heartbeats response, a current time is obtained. In one embodiment of the invention, the current time may be another timestamp identifying a present date/time observed by a system clock or timer residing on the active SPF. In Step 610, a determination is made as to whether the heartbeat response (listened for through Steps 606 and 608) has been received. If it is determined that the heartbeat response has been received, then the web application may be operating normally, and the process loops back to Step 602, wherein another heartbeat packet is issued to the web application. On the other hand, if it is alternatively determined that the heartbeat response has yet to be received, then the process proceeds to Step 612.

In Step 612, another determination is made as to whether an elapsed time (or difference) between the heartbeat issuance time (obtained in Step 604) and the current time (obtained in Step 608) exceeds a timeout period. In one embodiment of the invention, the timeout period may be a preset length of time within which waiting for the heartbeat response transpires before the web application is considered/deemed to be undergoing failover. If it is determined that the difference between the heartbeat issuance and current times does exceed the timeout period, then the process proceeds to Step 620 (see e.g., FIG. 6B). On the other hand, if it is alternatively determined that the difference between the heartbeat issuance and current times does not exceed the timeout period, then the process loops back to Step 606, wherein the heartbeat response is continued to be listened for from the web application.

Turning to FIG. 6B, in Step 620, after receiving the restore request (in Step 600) or after determining (in Step 612) that the difference between the heartbeat issuance and current times exceed the timeout period, an application status associated with the web application is modified. Specifically, in one embodiment of the invention, the application status may transition from a normal state/status to a failed state/status.

Thereafter, in Step 622, user client traffic (i.e., network traffic originating from one or more user clients (see e.g., FIG. 1)) is redirected from the active SPF to a peer SPF. In one embodiment of the invention, redirection of the user client traffic may entail issuing a redirect request to a domain name system (DNS). The redirect request may include an Internet Protocol (IP) address associated with a peer SPF, which the DNS may use to: select another IP address of a set of IP addresses specified in a DNS entry on the DNS (if the DNS entry refers to a domain name to multiple IP addresses mapping); or replace another IP address specified in the DNS entry on the DNS (if the DNS entry refers to a domain name to single IP address mapping). In another embodiment of the invention, redirection of the user client traffic may entail spoofing a farm status associated with the active SPF so that the active SPF appears to be experiencing failover. In spoofing the farm status, a status monitoring service (described above), either implemented on the DNS or by a third-party service (e.g., a failover monitoring service (FMS) (see e.g., FIG. 1)), may detect this change in farm status and, accordingly, may inform the DNS to modify a DNS entry to redirect user client traffic to the peer SPF. In yet another embodiment of the invention, redirection of the user client traffic may entail issuing a status notification to an external, third-party service (e.g., the FMS) which, in turn, upon receiving the status notification, may inform the DNS to modify a DNS entry accordingly.

In Step 624, redirection of the user client traffic to the peer SPF is verified. In one embodiment of the invention, verification of the redirection may entail receiving a response to the redirect request from the DNS. In another embodiment of the invention, verification of the redirection may entail receiving a response to the status notification from the FMS. In yet another embodiment of the invention, verification of the redirection may entail receiving a message from the peer SPF indicating that the peer SPF has assumed responsibilities of the active SPF.

Figure 7A:
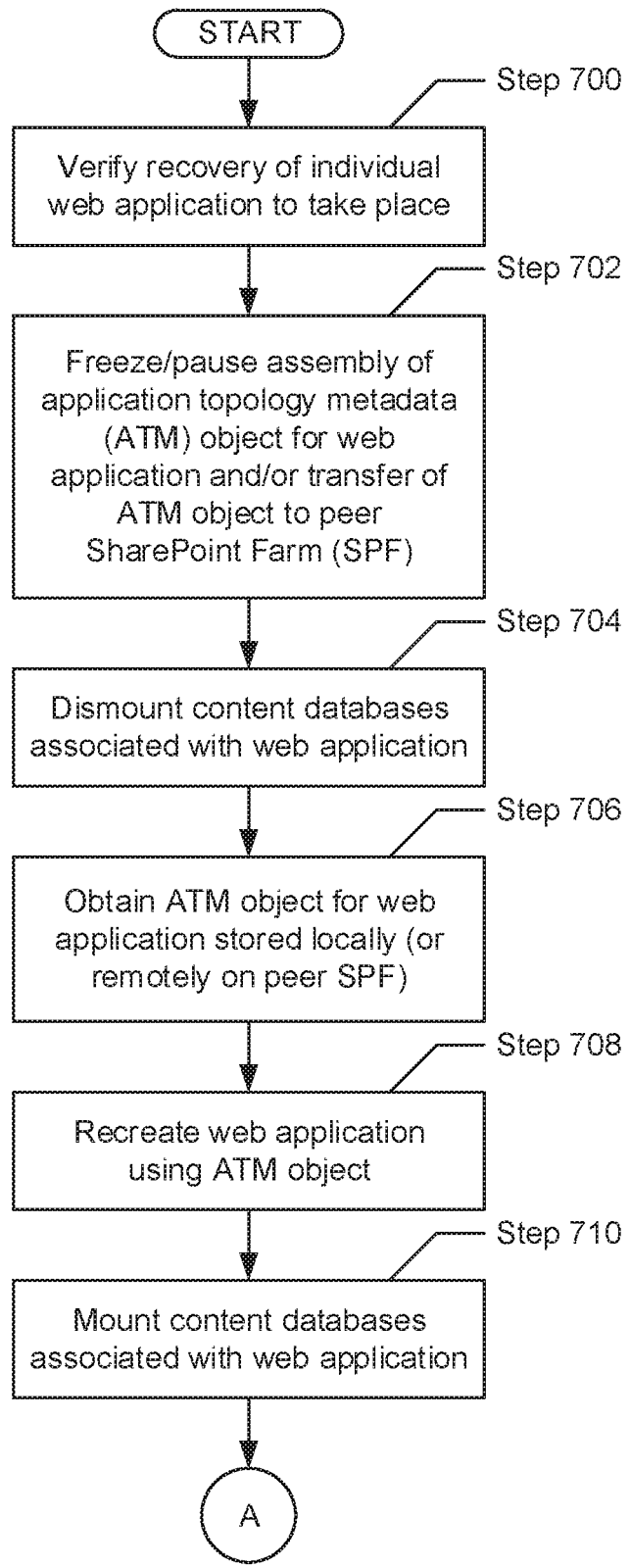
FIGS. 7A and 7B show flowcharts describing a method for recovering a single SharePoint web application in accordance with one or more embodiments of the invention.
Figure 7B:
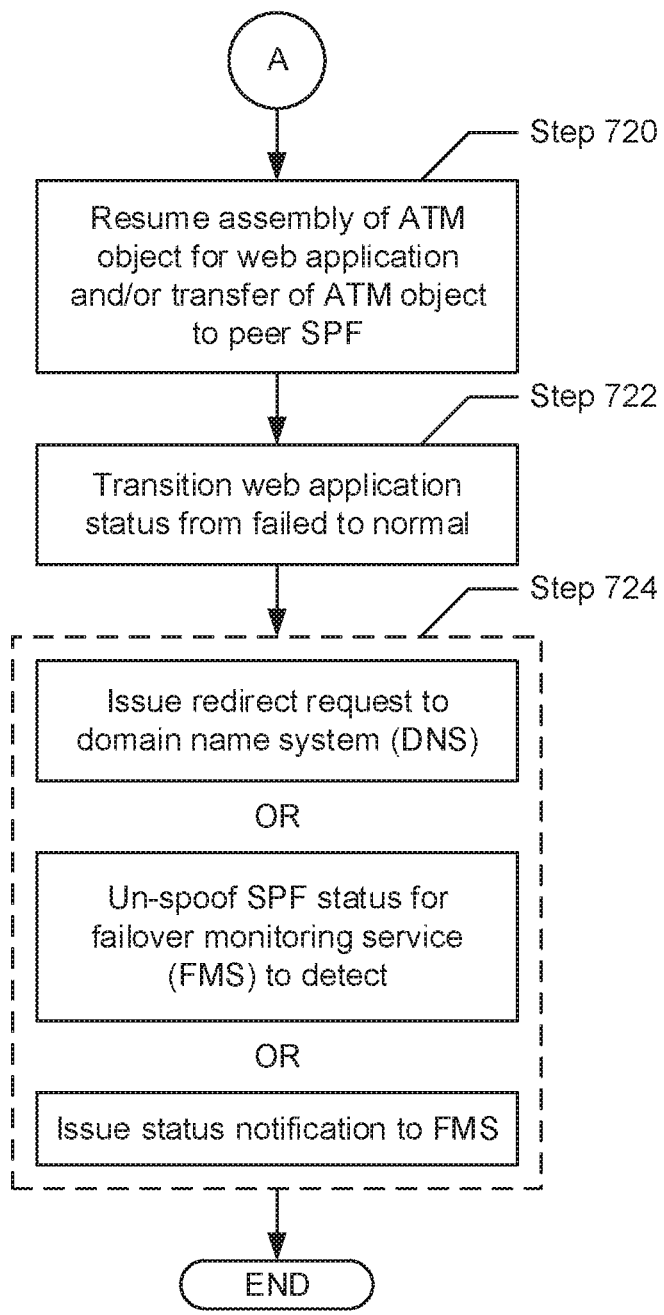

FIGS. 7A and 7B show flowcharts describing a method for recovering a single SharePoint web application in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 7A and 7B may be performed in parallel with any other steps shown in FIGS. 5-6B without departing from the scope of the invention.

Turning to FIG. 7A, in Step 700, the triggering of the method to recover a web application is verified. In one embodiment of the invention, verifying that a single web application is to be recovered may entail receiving a restore request for just a web application from an administrator client or, alternatively, issuing a heartbeat packet to the web application and determining the web application has crashed, failed, or is behaving abnormally (see e.g., FIG. 6A). In Step 702, after the verification (performed in Step 700), data backup operations executing on an active SharePoint farm (SPF) are paused. In one embodiment of the invention, data backup operations may refer to at least two tasks: the periodic assembling of application topology metadata (ATM) objects for the one or more web applications residing on the active SPF; and the sharing of these ATM objects, once generated, with one or more peer SPFs (see e.g., FIG. 5).

In Step 704, one or more content databases (see e.g., FIG. 2A) associated with the web application (that is to be recovered) are dismounted. In one embodiment of the invention, dismounting of the content database(s) may entail cutting off any web application access to the content database(s). In Step 706, a most recently stored ATM object associated with the web application is obtained. In one embodiment of the invention, the ATM object may be retrieved from a local application metadata repository (see e.g., FIG. 3) within a local application recovery agent (ARA) executing on the active SPF. In another embodiment of the invention, the ATM object may be requested from a remote application metadata repository within a remote ARA executing on a peer SPF.

In Step 708, the web application is recreated using the ATM object (obtained in Step 706). In one embodiment of the invention, recreation of the web application may entail:

first, deleting the failed web application, thereby clearing any existing overhead associated with the failed web application; and second, generating a new web application (i.e., a recovered web application) using the application recovery information (ARI) specified in the ATM object. In Step 710, the content database(s) (dismounted in Step 704) are remounted. In one embodiment of the invention, remounting the content database(s) may entail allowing web application access to the content database(s).

Turning to FIG. 7B, in Step 720, after remounting the content database(s), data backup operations on the active SPF are resumed. Specifically, in one embodiment of the invention, at least the periodic assembly of ATM objects for the web application(s) on the active SPF and the sharing of the ATM objects, once generated, with one or more peer SPFs. In Step 722, an application status associated with the web application is modified. Specifically, in one embodiment of the invention, the application status may transition from a failed state/status to a normal state/status.

In Step 724, user client traffic (i.e., network traffic originating from one or more user clients (see e.g., FIG. 1)) is redirected from the active SPF to a peer SPF. In one embodiment of the invention, redirection of the user client traffic may entail issuing a redirect request to a domain name system (DNS). The redirect request may include an Internet Protocol (IP) address associated with a peer SPF, which the DNS may use to: select another IP address of a set of IP addresses specified in a DNS entry on the DNS (if the DNS entry refers to a domain name to multiple IP addresses mapping); or replace another IP address specified in the DNS entry on the DNS (if the DNS entry refers to a domain name to single IP address mapping). In another embodiment of the invention, redirection of the user client traffic may entail spoofing a farm status associated with the active SPF so that the active SPF appears to be experiencing failover. In spoofing the farm status, a status monitoring service (described above), either implemented on the DNS or by a third-party service (e.g., a failover monitoring service (FMS) (see e.g., FIG. 1)), may detect this change in farm status and, accordingly, may inform the DNS to modify a DNS entry to redirect user client traffic to the peer SPF. In yet another embodiment of the invention, redirection of the user client traffic may entail issuing a status notification to an external, third-party service (e.g., the FMS) which, in turn, upon receiving the status notification, may inform the DNS to modify a DNS entry accordingly.

Figure 8:
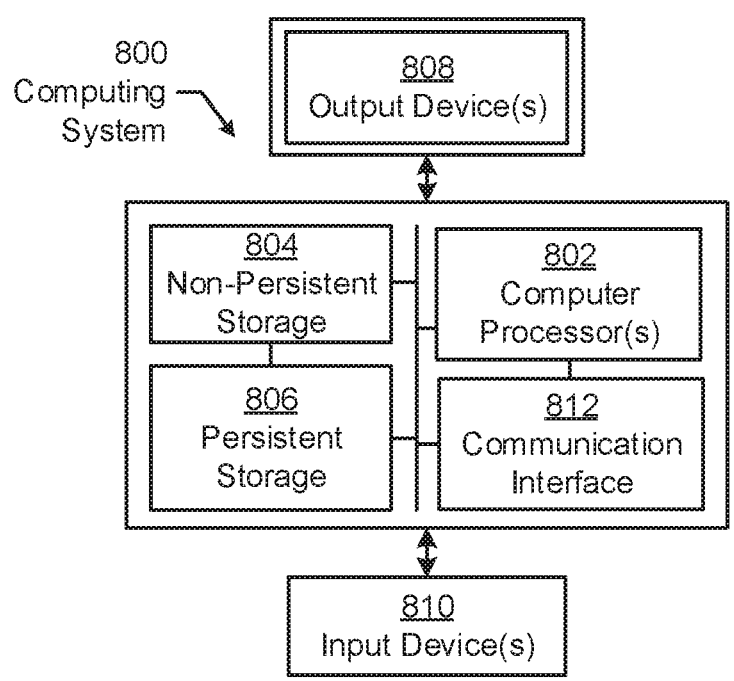
FIG. 8 shows a computing system in accordance with one or more embodiments of the invention.

FIG. 8 shows a computing system in accordance with one or more embodiments of the invention. The computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device. Further, the communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

In one embodiment of the invention, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for web application recovery, comprising:
    verifying that a web application on a first collaborative platform farm (CPF) is to be recovered;
    based on the verifying:
        redirecting user client traffic from the first CPF to a second CPF;
        pausing data backup operations on the first CPF;
        dismounting at least one content database associated with the web application;
        obtaining an application topology metadata (ATM) object; and
        recreating, using the ATM object, the web application to obtain a recovered web application.

2. The method of claim 1, wherein the data backup operations comprise a continuous assembly of ATM objects and a sharing of the ATM objects with the second CPF, wherein the second CPF is operatively connected to the first CPF.

3. The method of claim 1, wherein the ATM object comprises application recreation information (ARI) comprising a web application name associated with the web application, user authentication credentials, user secure sockets layer (SSL) certificates, a default zone uniform resource locator (URL), and application pool information.

4. The method of claim 1, wherein the ATM object is obtained from one selected from a group consisting of a first application metadata repository on the first CPF and a second application metadata repository on the second CPF, wherein the second CPF is operatively connected to the first CPF.

5. The method of claim 1, further comprising:
mounting the at least one content database to the recovered web application;
resuming the data backup operations on the first CPF; and
redirecting the user client traffic from the second CPF to the first CPF.

6. The method of claim 5, wherein redirecting the user client traffic from the first CPF to the second CPF comprises issuing a first redirect request to a domain name system (DNS) operatively connected to the first CPF and the second CPF, wherein redirecting the user client traffic from the second CPF to the first CPF comprises issuing a second redirect request to the DNS.

7. The method of claim 5,
wherein redirecting the user client traffic from the first CPF to the second CPF comprises spoofing a status of the first CPF to exhibit failover,
wherein a failover monitoring service (FMS), based on detecting the failover, notifies a domain name system (DNS) of the failover,
wherein redirecting the user client traffic from the second CPF to the first CPF comprises un-spoofing the status of the first CPF to exhibit normal operations,
wherein the FMS, based on detecting the normal operations, notifies the DNS of the normal operations, and
wherein the DNS is operatively connected to the first CPF and the second CPF, wherein the FMS is operatively connected to at least the first CPF.

8. The method of claim 5,
wherein redirecting the user client traffic from the first CPF to the second CPF comprises issuing a first status notification to a failover monitoring service (FMS),
wherein the FMS, based on the first status notification, notifies a domain name system (DNS) that the first CPF has experienced failover,
wherein redirecting the user client traffic from the second CPF to the first CPF comprises issuing a second status notification to the FMS,
wherein the FMS, based on the second status notification, notifies the DNS that the first CPF is executing normally, and
wherein the DNS is operatively connected to the first CPF and the second CPF, wherein the FMS is operatively connected to at least the first CPF.

9. The method of claim 1, wherein verifying that the web application on the first CPF is to be recovered, comprises:
receiving, from an administrator client, a restore request comprising a web application identifier (ID) associated with the web application;
determining, based on at least on receiving the restore request, that recovery a full CPF restore for the first CPF is not sought; and
verifying, based on the determining, that the web application on the first CPF is to be recovered.

10. The method of claim 1, wherein verifying that the web application on the first CPF is to be recovered, comprises:
issuing a heartbeat packet to the web application;
obtaining a heartbeat issuance time for the heartbeat packet;
listening for a heartbeat response from the web application;
obtaining, while listening for the heartbeat response, a current time;
making a first determination, based on the listening, that the heartbeat response has yet to be received;
making a second determination that a difference between the heartbeat issuance time and the current time exceeds a timeout period;
making a third determination, based on the first and second determinations, that the web application has experienced failover; and
verifying, based on the third determination, that the web application on the first CPF is to be recovered.

11. The method of claim 1, further comprising:
prior to verifying that the web application on the first CPF is to be recovered:
aggregating application recreation information (ARI) for the web application using a web application name associated with the web application, user authentication credentials, user secure sockets layer (SSL) certificates, a default zone uniform resource locator (URL), and application pool information; and
generating the ATM object using the ARI.

12. A system, comprising:
a first collaborative platform farm (CPF) operatively connected to a second CPF; and
an application recovery agent (ARA) executing on the first CPF, and programmed to:
verify that a web application on the first CPF is to be recovered;
based on the verifying:
redirect user client traffic from the first CPF to the second CPF;
pause data backup operations on the first CPF;
dismount at least one content database associated with the web application;
obtain an application topology metadata (ATM) object; and
recreate, using the ATM object, the web application to obtain a recovered web application.

13. The system of claim 12, wherein the ARA comprises an agent kernel, an application metadata assembler (AMA), an application heartbeat tracker (AHT), an intra-farm communicator (IFC), and an application metadata repository.

14. The system of claim 12, wherein the first CPF comprises the ARA, a configuration database, the at least one content database, at least one web application comprising the web application, an application programming interface (API), and a peer CPF communicator.

15. The system of claim 14, wherein each web application of the at least one web application comprises at least one site collection, wherein the at least one site collection comprises a plurality of sites comprising a top level site and at least one sub-site, wherein each site of the plurality of sites comprises at least one list, wherein the at least one list comprises at least one field and a plurality of list items.

16. The system of claim 12, further comprising an administrator client operatively connected to the ARA.

17. The system of claim 12, further comprising a domain name system (DNS) operatively connected to the first CPF and the second CPF.

18. The system of claim 17, further comprising a failover monitoring service (FMS) operatively connected to the first CPF and the DNS.

19. The system of claim 17, further comprising a user client operatively connected to the DNS, wherein the user client traffic pertains to network traffic originating from the user client.

20. A non-transitory computer readable medium comprising computer readable program code, which when executed by a computer processor, enables the computer processor to:

verify that a web application on a first collaborative platform farm (CPF) is to be recovered;
based on the verifying:
  redirect user client traffic from the first CPF to a second CPF;
  pause data backup operations on the first CPF;
  dismount at least one content database associated with the web application;
  obtain an application topology metadata (ATM) object; and
  recreate, using the ATM object, the web application to obtain a recovered web application.

* * * * *

UNITED STATES PATENT AND TRADEMARK OFFICE
CERTIFICATE OF CORRECTION

PATENT NO. : 10,572,353 B2
APPLICATION NO. : 15/965791
DATED : February 25, 2020
INVENTOR(S) : Sunil Yadav et al.

Page 1 of 1

It is certified that error appears in the above-identified patent and that said Letters Patent is hereby corrected as shown below:

In the Claims

Column 17, Line 52 Claim 9, the phrase "based on at least on" should read -- based on at least one --.

Signed and Sealed this
Thirteenth Day of October, 2020

Andrei Iancu
*Director of the United States Patent and Trademark Office*